Patented Jan. 13, 1931

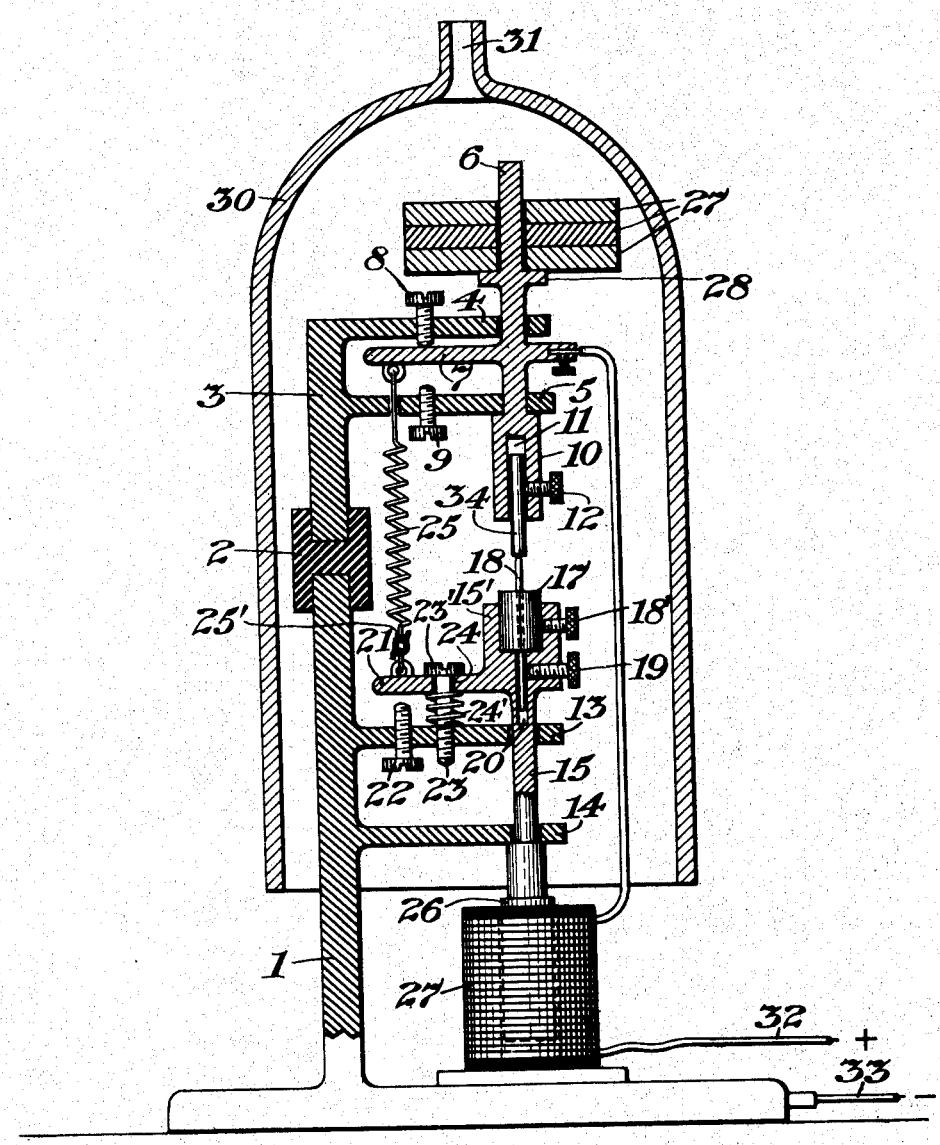

1,788,908

UNITED STATES PATENT OFFICE

LEROY J. BUTTOLPH, OF EAST ORANGE, NEW JERSEY, ASSIGNOR TO GENERAL ELECTRIC VAPOR LAMP COMPANY, OF HOBOKEN, NEW JERSEY, A CORPORATION OF NEW JERSEY

ELECTROPERCUSSIVE WELDING APPARATUS

Application filed July 8, 1924. Serial No. 724,760.

My present invention relates to apparatus for electric welding of metal and particularly for welding pieces of relatively small cross section to pieces of larger cross section.
Due to the great difference in heat capacity and conductivity it is generally difficult to weld a piece of metal of small cross section such as wire of about .025" to a larger piece of metal such as wire .1" in diameter or to a flat sheet of metal. This difficulty has to some extent been solved by the now well known condenser discharge method of welding in which a charged condenser of very great capacity is discharged by bringing pieces of metal of small cross section quickly to contact with a larger piece whereby the condenser is instantaneously discharged and a weld secured at the point of contact of the two pieces of metal and whereby said weld is effected before the metal beyond the point of welding has had time to become heated. The small period of time in which the electric discharge is accomplished and the high degree of accuracy with which the quantity and energy delivered can be controlled are shown by the great advantages of this condenser discharge method of welding. However, apparatus for this form of welding are expensive in design and construction and not practical for many uses.
In the apparatus of my invention I employ a much simpler and cheaper means for attaining results secured by the said condenser method of welding, in which I employ a weight falling through a given distance to time a welding period in which the welding operation is started the moment said weight begins to fall and stopped when the fall of said weight is stopped.
Practically in the welding of a small tungsten wire, for example, .020" in diameter to the larger wire, for example, .1" in diameter there results in addition to a dissimilar heating of the two parts an appreciable degree of crystallization in the material being welded immediately adjacent to the weld. It is quite apparent that the process of this crystallization involves an appreciable length of time, that is, a matter of several hundredths of a second, or at least a time interval which is long as compared with the time interval required for the cooling of the molten metal at the weld to avoid a solid state; for example, this crystallization time is much greater than the time required for welding two of said pieces of metal together.

It is therefore an object of my invention to provide means for the formation and extinction of a high current welding arc directly between two points to be welded, an arc being formed and extinction taking place in a time interval of sufficient duration to locally heat to melting the point of contact on the larger object co-incident with the time the smaller object reaches its welding temperature at its point of contact and in which there is formed on the surface of the larger object as well as on the smaller one a point of molten metal of minimum size and as localized as possible.

It is further an object of my invention to provide apparatus for welding a piece of metal of small cross section to one of larger cross section in which arcing as the source of heat disappears at the instant of contact and fusion between the two parts being welded and in which the heat capacity and conductivity of the larger piece together with parts of said apparatus is great enough to cool the molten metal at the welding point to solidity in a time interval too short to permit crystal formation in the molten material and to prevent crystal formation anywhere along the temperature gradient from the melting and welding temperature through to the ordinary temperature of the main masses of the parts being welded.

In the apparatus of my invention I attach one of the two objects to a movable clamp and current conducting system whose inertia can be adjusted to any desired value by the addition of firmly attached weights and which is actuated by gravity or by a spring of any desired tension. I attach the other object to a clamp and current conducting system itself actuated by an electromagnet connected in series with the welding arc. I place the two object carrying clamps in such a relative position that the first object is held either by gravity or by a spring against the second object and in such a manner that the two parts are in the desired welding position, and electrical connection is established between them. Upon closing the circuit the second object is electromagnetically drawn away from the first, an arc being thus formed whose intensity may be made of any desired value by means of an adjustable resistance and whose length is fixed by mechanical stops on the apparatus. The second object then moves forward into contact with the first during a time interval determined closely and definitely by gravity or by the spring tension and by the adjustable inertia of the movable system. Immediately thereafter I open the main circuit either by a hand operated switch or by a properly set delayed action circuit breaker.

In the drawing which forms part of this application is shown in vertical elevation in part section a standard supporting two wires of different cross section to be welded together, the upper one of them being weighted and the lower being connected to an armature in a solenoid which is connected in series with the welding circuit.

In the drawing the standard 1 supports and is insulated from by the insulating joint 2, the bracket 3 which extends over the base of said standard 1. Said bracket 3 comprises two horizontal arms 4 and 5 one above the other through which is vertically and slidably mounted the rod 6 whose horizontal arm 7 is positioned between said arms 4 and 5 and the extent of whose movements between said arms and of the movement of rod 6 is determined and limited by the screws 8 and 9 which pass through arms 4 and 5 respectively. The lower end of said rod 6 terminate in a wire holder 10 which has therein a vertical hole 11 in which the wire to be welded is positioned and held by the set screw 12. On said vertical standard 1 are the horizontal arms 13 and 14 which extend below said arms 4 and 5 and which have slidably mounted therethrough directly below said rod 6 the rod 15. On the upper end of said rod 15 is mounted the clamping socket 15' in which are held the parts of the split carbon sleeve 17 and in said carbon sleeve 17 the wire 18 which is to be welded to the wire 34, these being held in place by the set screw 18' which presses against the carbon sleeve and the said screw 19 which presses against the said wire 18 which extend downwardly into hole 20 provided therefor in said rod 15. On said rod 15 is mounted an arm 21 which extends horizontally over and above said arm 13 and whose movement thereto and therefrom is limited by the screw 22 passing upwardly through said arm 13, and the screw 23 which passes through hole 24 in said arm 21 and is screwed into said arm 13, the head 23' thereof limiting the upward movement of said arm 21 against which head the spring 24' tends to hold said arm 21. The said arm 21 and the said arm 7 are connected by the tension spring 25 fastened at one end to arm 7 and at its other to arm 21 and insulated from the latter by the link 25' of insulating material. On the lower end of said rod 15 is fixed the magnetic armature 26 which operates in the solenoid 27 which is connected in series between the main lead 32 and the upper wire clamp 10. The lower wire clamp 15' is connected through standard 1 to the opposite supply main 33. On said rod 6 are adjusted the ring weights 27 which can be slipped over the end thereof and which are held by the collar 28 on said rod 6. About the welding apparatus is mounted the bell jar 30 of glass which has at its top an inlet 31 for some suitable inert gas which is used for some welding operations.

In the operation of the device of my invention a wire 34 of comparatively large cross section is secured in one of the clamps as in clamp 10 in the drawing and a wire 18 of smaller cross section is clamped between the carbon jaws 17 of clamp 15. The spring 25 under tension serving to hold them in direct contact with each other. The leads 32 and 33 are then connected to a source of current which flows through the circuit including the two wires to be welded and energizes the solenoid 27 whereupon armature 26 and wire 18 are drawn downwardly. The separation of the two wires 18 and 34 due to this action occupies an appreciable duration of time due to the inertia of the clamp 10 and the weights attached to it and spring 25 during which time an arc is formed between the two said wires. This period of separation is terminated by the movement of the upper wire downwardly caused by the weight of the parts attached to it and the force of spring 25. The duration of time of separation is adjusted by varying the number of weights 27 mounted on rod 26 and by varying the strength of spring 25 to suit the size of wires to be welded. Upon the downward movement of the upper wire into contact with the lower wire they are welded together at their parts which have been molten by the arc upon which the arc is extinguished. At this point in the operation the mains 32 and 33 are disconnected from the source of current supplied either manually or by the preadjusted time switch.

Although the apparatus of my invention is shown as being mounted vertically and as utilizing the force of gravity in cooperation with spring 25 it is to be understood that the device can be arranged to be mounted horizontally or in some other position the tension of spring 25 and the number of weights 27 being suited to produce the desired inertia and speed of movement of the electrode thereto attached.

I claim:

1. In an electric welding apparatus means comprising separate members for supporting two elements to be welded one resting upon the other, said means being movable to allow downward movement of said elements, resilient means connecting said supporting members tending to draw them together when one is moved away from the other, means for connecting the terminals of a source of electric current one to each of said elements, and means for quickly moving the lower of said elements downwardly from the other element.

2. In an electric welding apparatus means for supporting two elements to be welded one resting upon the other, said means being movable to allow downward movement of said elements, means for connecting the terminals of a source of electric current one to each of said elements, means responsive to current flow from said source through and between said elements for quickly moving the lower of said elements downwardly from the other element, and means for varying the inertia of the parts mechanically connected to said other element.

3. In an electric welding apparatus means comprising separate members for supporting two elements to be welded one resting upon the other, said means being flexible to allow downward movement of said elements, means for connecting the terminals of a source of electric current one to each of said elements, means for quickly moving lower of said elements downwardly from the other element and for flexing said flexible means to allow said movement and resilient means connecting said supporting members tending to draw them together when one is moved away from the other.

4. In an electric welding apparatus means comprising separate members for holding two elements to be welded one resting against the other, said means being flexible to allow movement of said elements, means for connecting the terminals of a source of electric current one to each of said elements, means for quickly moving one of said elements away from the other element and for flexing said flexible means to allow said movement, and means comprising resilient means connecting the supporting members of the two elements for moving other said element after and against first said element.

5. In an electric welding apparatus resilient means comprising separate members for holding two elements to be welded one resting against the other, said means being flexible to allow movement of said elements, means for connecting the terminals of a source of electric current one to each of said elements, means responsive to current flow from said source through and between said elements for quickly moving one of said elements from the other element and for flexing said flexible means to allow said movement, and means comprising resilient means connecting the supporting members of the two elements for moving other said element after and against first said element.

6. In an electric welding apparatus resilient means comprising separate members for holding two elements to be welded one resting against the other, said means being flexible to allow movement of said elements, means for connecting the terminals of a source of electric current one to each of said elements, means responsive to current flow from said source through and between said elements for quickly moving one of said elements away from the other element and for flexing said flexible means to allow said movement, and means comprising resilient means connecting the supporting members of the two elements for moving other said element after and against first said element.

7. In an electric welding apparatus resilient means for holding two elements to be welded one resting against the other, said means being flexible to allow movement of said elements, means for connecting the terminals of a source of electric current one to each of said elements, means responsive to current flow from said source through and between said elements for quickly moving one of said elements away from the other element and for flexing said flexible means to allow said movement, means for moving other said element after and against first said element, and means for varying the inertia of said other element and of the parts connected to and mechanically movable with it.

8. In an electric welding apparatus resilient means for supporting two elements to be welded one resting upon the other, said means being flexible to allow downward movement of said elements, means for connecting the terminals of a source of electric current one to each of said elements and means responsive to current flow from said source through said elements for quickly moving the lower of said elements downwardly from the other element and for flexing said flexible means to allow said movement.

9. In an electric welding apparatus resilient means comprising separate members for supporting two elements to be welded one resting upon the other, said means being flexible to allow downward movement of said elements, resilient means connecting said supporting members tending to draw one of them to the other when they are moved apart, means for connecting the terminals of a source of electric current to each of said elements, means for quickly moving the lower of said elements downwardly from the other element and for flexing said flexible means to allow said movement, and means for limiting the movement of said elements.

10. In an electric welding apparatus resilient means comprising separate members for supporting two elements to be welded one resting upon the other, said means being flexible to allow downward movement of said elements, resilient means connecting said supporting members tending to draw one of them to the other when they are moved apart, means for connecting the terminals of a source of electric current one to each of said elements, means responsive to current flow from said source through said elements for quickly moving the lower of said elements downwardly from the other element and for flexing said flexible means to allow said movement, and means for limiting the movement of said elements.

11. In an electric welding apparatus two clamping members one positioned above the other and adapted for vertical movement, flexible means for supporting said clamps and elements to be welded, one of said elements resting upon the other, said means being flexible to allow downward movement of said elements, resilient means connecting said members tending to draw one of them to the other when they are moved apart, means for connecting the terminals of a source of electric current one to each of said elements, means responsive to current flow from said source through and between said elements for quickly moving the lower of said clamps and the element held therein downwardly from the other element.

12. In an electric welding apparatus means comprising movable members for holding two elements to be welded one against the other, one of the elements being movable away from the other, and resilient means connecting said members and tending to draw one of them to the other when they are moved apart.

13. In an electric welding apparatus means comprising movable members for holding two elements to be welded one against the other, one of the elements being movable away from the other, resilient means connecting said members and tending to draw one of them to the other when they are moved apart, and means for moving one of the elements away from the other against the tension of said resilient means.

14. In an electric welding apparatus means comprising movable members for holding two elements to be welded one against the other, one of the elements being movable away from the other, resilient means connecting said members and tending to draw one of them to the other when they are moved apart, means for moving one of the elements away from the other against the tension of said resilient means, and means for varying the inertia of the other element and of the parts connected to and mechanically movable with it.

15. In an electric welding apparatus, means comprising movable members for holding two elements to be welded one against the other, one of the elements being movable away from the other and resilient means under tension connecting said members and tending to hold or draw them together.

16. In an electric welding apparatus, means comprising movable members for holding two elements to be welded one against the other, one of the members being movable away from the other, resilient means under tension connecting said members and tending to hold or draw them together and means for moving one of the members away from the other against the tension of said resilient means.

Signed at Hoboken, in the county of Hudson and State of New Jersey, this 3rd day of July, A. D. 1924.

LEROY J. BUTTOLPH.